United States Patent
Kim

(10) Patent No.: US 9,323,324 B2
(45) Date of Patent: Apr. 26, 2016

(54) MOBILE TERMINAL AND OPERATION CONTROL METHOD THEREOF

(75) Inventor: Jonghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 687 days.

(21) Appl. No.: 13/190,691

(22) Filed: Jul. 26, 2011

(65) Prior Publication Data

US 2012/0083312 A1    Apr. 5, 2012

(30) Foreign Application Priority Data

Oct. 5, 2010 (KR) .......................... 10-2010-0096984

(51) Int. Cl.

| | | |
|---|---|---|
| *G06F 3/01* | (2006.01) | |
| *G02B 13/00* | (2006.01) | |
| *G02B 27/00* | (2006.01) | |
| *G02B 27/22* | (2006.01) | |
| *G06F 1/16* | (2006.01) | |
| *G06F 3/03* | (2006.01) | |

(Continued)

(52) U.S. Cl.
CPC .............. *G06F 3/013* (2013.01); *G02B 13/001* (2013.01); *G02B 27/0093* (2013.01); *G02B 27/225* (2013.01); *G02B 27/2214* (2013.01); *G06F 1/1694* (2013.01); *G06F 3/0304* (2013.01); *G06F 3/04815* (2013.01); *H04N 13/0484* (2013.01); *H04N 13/0497* (2013.01); *H04N 13/0022* (2013.01)

(58) Field of Classification Search
CPC .............. G02B 13/001; G02B 27/0093; G02B 27/2214; G02B 27/225; G06F 1/1694; G06F 3/013; G06F 3/0304; G06F 3/04815; H04N 13/0484; H04N 13/0497; H04N 13/0022

USPC ........................................................ 382/154
See application file for complete search history.

(56) References Cited

U.S. PATENT DOCUMENTS

| 2004/0240777 A1 | 12/2004 | Woodgate et al. | |
|---|---|---|---|
| 2006/0093998 A1* | 5/2006 | Vertegaal ................ | G06F 3/011 434/236 |

(Continued)

FOREIGN PATENT DOCUMENTS

| CN | 1875302 A | 12/2006 |
|---|---|---|
| CN | 101067716 A | 11/2007 |
| EP | 2395762 A2 | 12/2011 |

OTHER PUBLICATIONS

Pastoor et al, "An Experimental Multimedia System Allowing 3-D Visualization and Eye-Controlled Interaction Without User-Worn Devices", Mar. 1999, IEEE Transactions on Multimedia, vol. 1, No. 1, pp. 41-52.*

(Continued)

*Primary Examiner* — Edward Park
(74) *Attorney, Agent, or Firm* — Birch, Stewart, Kolasch & Birch, LLP

(57) ABSTRACT

A mobile terminal and an operation control method thereof are provided. The operation control method includes displaying a stereoscopic 3D image, which is created based on the disparity between left- and right-eye images, on a display module; determining a position of a user's gaze on the stereoscopic 3D image by performing eye tracking; and varying a 3D effect of a portion of the stereoscopic 3D image corresponding to the determined gaze position. Therefore, it is possible to effectively control various operations performed by a mobile terminal in connection with a stereoscopic 3D image by using eye tracking.

11 Claims, 13 Drawing Sheets

(51) Int. Cl.
*G06F 3/0481* (2013.01)
*H04N 13/04* (2006.01)
*H04N 13/00* (2006.01)

(56) References Cited

U.S. PATENT DOCUMENTS

| | | |
|---|---|---|
| 2006/0126919 A1* | 6/2006 | Kitaura et al. ............... 382/154 |
| 2007/0091638 A1* | 4/2007 | Ijzerman et al. ............. 362/611 |
| 2008/0102951 A1* | 5/2008 | Eto et al. ..................... 463/32 |
| 2009/0245600 A1* | 10/2009 | Hoffman ............ A61B 1/00039 382/128 |
| 2009/0273562 A1* | 11/2009 | Baliga et al. .................. 345/157 |
| 2011/0029918 A1* | 2/2011 | Yoo et al. ...................... 715/800 |

OTHER PUBLICATIONS

Pastoor et al., "An Experimental Multimedia System Allowing 3-D Visualization and Eye-Controlled Interaction Without User-Worn Devices", IEEE Transactions on Multimedia, vol. 1, No. 1, Mar. 1999, pp. 41-52, XP011036280.

\* cited by examiner

FIG. 8
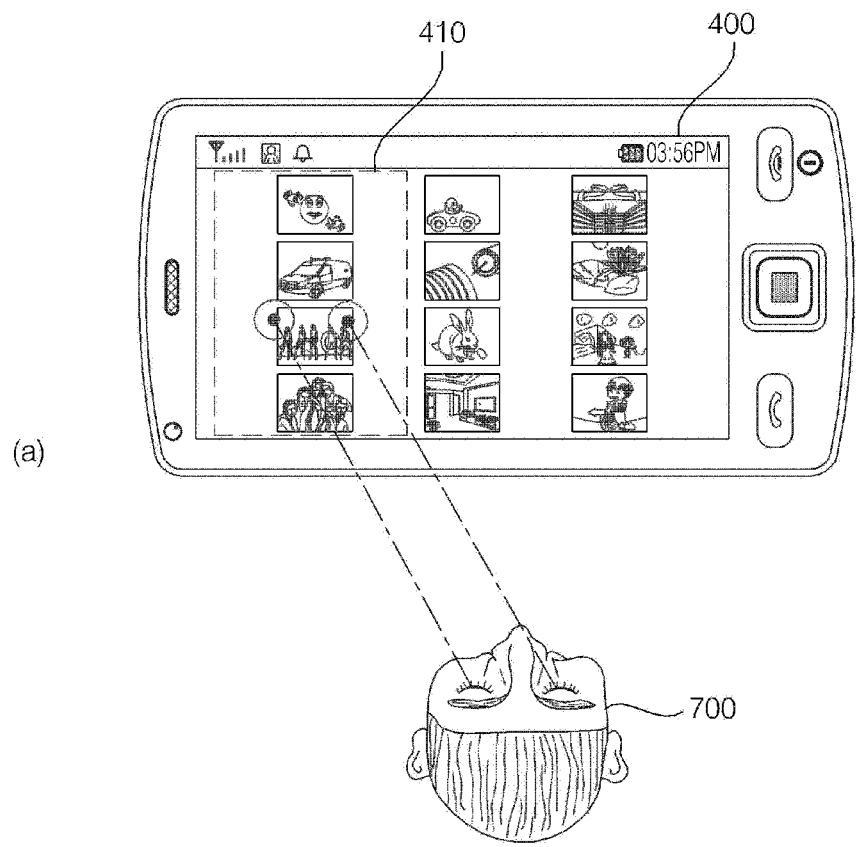
(a)
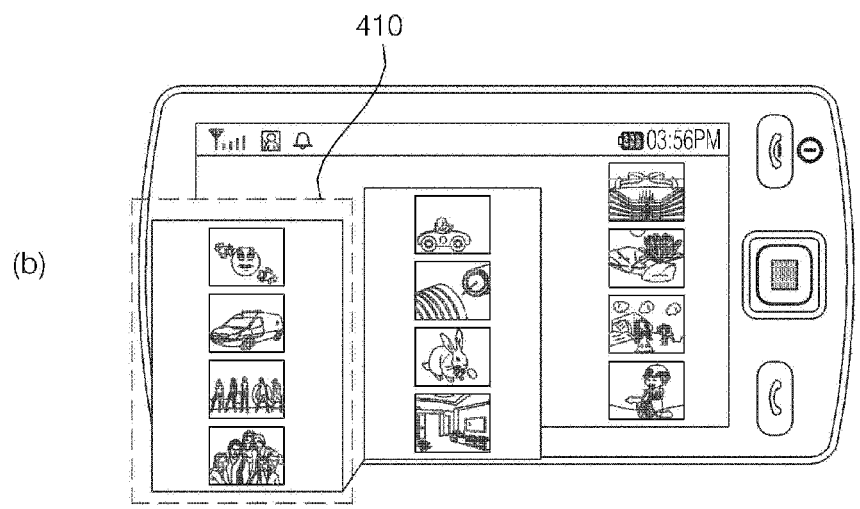
(b)

MOBILE TERMINAL AND OPERATION CONTROL METHOD THEREOF

CROSS-REFERENCE TO RELATED APPLICATION

This application claims the priority benefit of Korean Patent Application No. 10-2010-0096984,filed on Oct. 5, 2010 in the Korean Intellectual Property Office, the disclosure of which is incorporated herein by reference.

BACKGROUND OF THE INVENTION

1. Field of the Invention

The present invention relates to a mobile terminal and an operation control method thereof, and more particularly, to a mobile terminal and an operation control method of the mobile terminal, in which various operations performed by the mobile terminal in connection with stereoscopic three-dimensional (3D) images can be controlled using eye tracking.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals has steadily grown due to a growing tendency of considering mobile terminals as personal items that can represent personal individuality.

In the meantime, stereoscopic three-dimensional (3D) imaging, which is a technique of combining multiple images captured by a camera to create a stereoscopic 3D image, have recently become commonplace. When applied to mobile terminals, stereoscopic 3D imaging can allow the users to create stereoscopic 3D images using the cameras of the mobile terminals and to display various stereoscopic 3D images on the displays of the mobile terminals.

Eye tracking is a technique of keeping track of a user's gaze by analyzing images of the user captured by a camera. Eye tracking has been widely employed in various fields such as sportscasting, the development of systems for physically challenged individuals, and consumer behavior analysis, and research is being conducted into various algorithms for the development of interfaces for eye tracking.

Therefore, a method is needed to control various operations performed by mobile terminals in connection with stereoscopic 3D images using eye tracking.

SUMMARY OF THE INVENTION

The present invention provides a mobile terminal and an operation control method of the mobile terminal, in which various operations performed by the mobile terminal in connection with stereoscopic three-dimensional (3D) images can be controlled using eye tracking.

According to an aspect of the present invention, there is provided an operation control method of a mobile terminal, the operation control method including displaying a stereoscopic 3D image, which is created based on the disparity between left- and right-eye images, on a display module; determining a position of a user's gaze on the stereoscopic 3D image by performing eye tracking; and varying a 3D effect of a portion of the stereoscopic 3D image corresponding to the determined gaze position. According to another aspect of the present invention, there is provided a mobile terminal, including a camera; a display module configured to display a stereoscopic 3D image, which is created based on the disparity between left- and right-eye images; and a controller configured to determine a position of a user's gaze on the stereoscopic 3D image by performing eye tracking based on an image of the user captured by the camera and to vary a 3D effect of a portion of the stereoscopic 3D image corresponding to the determined gaze position.

According to another aspect of the present invention, there is provided an operation control method of a mobile terminal, the operation control method including displaying a stereoscopic 3D image, which is created based on the disparity between left- and right-eye images, on a display module; in response to an occurrence of a communication event being detected, determining a position of a user's gaze on the stereoscopic 3D image by performing eye tracking; and displaying notice information indicating the occurrence of the communication event at a portion of the stereoscopic 3D image corresponding to the determined gaze position.

According to another aspect of the present invention, there is provided a mobile terminal, including a camera; a display module configured to display a stereoscopic 3D image, which is created based on the disparity between left- and right-eye images; and a controller configured to, in response to an occurrence of a communication event being detected, determine a position of a user's gaze on the stereoscopic 3D image by performing eye tracking based on an image of the user captured by the camera and to displaying notice information indicating the occurrence of the communication event at a portion of the stereoscopic 3D image corresponding to the determined gaze position.

According to another aspect of the present invention, there is provided an operation control method of a mobile terminal, the operation control method including displaying a stereoscopic 3D menu screen, which is created based on the disparity between left- and right-eye images, on a display module; determining a position of a user's gaze on the stereoscopic 3D menu screen by performing eye tracking; and performing a function relevant to an object in the stereoscopic 3D menu screen corresponding to the determined gaze position.

According to another aspect of the present invention, there is provided a mobile terminal, including a camera; a display module configured to display a stereoscopic 3D menu screen, which is created based on the disparity between left- and right-eye images; and a controller configured to determining a position of a user's gaze on the stereoscopic 3D menu screen by performing eye tracking based on an image of the user captured by the camera and to perform a function relevant to an object in the stereoscopic 3D menu screen corresponding to the determined gaze position.

According to another aspect of the present invention, there is provided an operation control method of a mobile terminal, the operation control method including displaying a stereoscopic 3D image, which is created based on the disparity between left- and right-eye images, on a display module;

determining a position of a user's gaze on the stereoscopic 3D image by performing eye tracking; and displaying a stereoscopic 3D pointer over a portion of the stereoscopic 3D image corresponding to the determined gaze position.

According to another aspect of the present invention, there is provided a mobile terminal, including a camera; a display module configured to display a stereoscopic 3D image, which is created based on the disparity between left- and right-eye images; and a controller configured to determine a position of a user's gaze on the stereoscopic 3D image by performing eye tracking based on an image of the user captured by the camera and to display a stereoscopic 3D pointer over a portion of the stereoscopic 3D image corresponding to the determined gaze position.

BRIEF DESCRIPTION OF THE DRAWINGS

The above and other features and advantages of the present invention will become more apparent by describing in detail preferred embodiments thereof with reference to the attached drawings in which:

FIGS. 8 through 13 are diagrams illustrating the exemplary embodiments of FIGS. 4 through 7.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), a camera, a navigation device, a tablet computer, or an electronic book (e-book) reader. In this disclosure, the terms 'module' and 'unit' can be used interchangeably.

Figure 1:
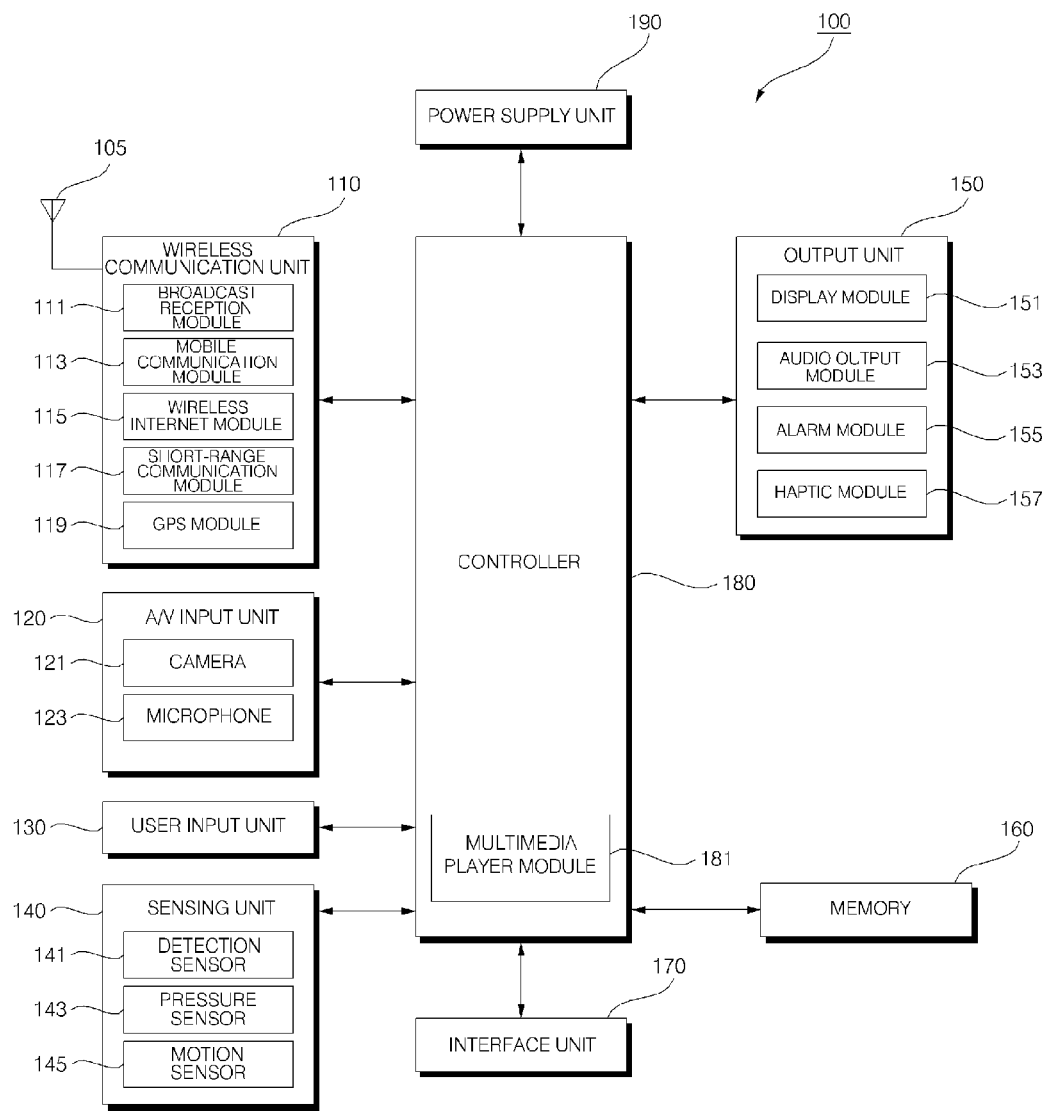
FIG. 1 is a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, in a case in which the user input unit 130 is implemented as a touch pad and forms a mutual layer structure with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141.

The pressure sensor 143 may determine whether pressure is being applied to the mobile terminal 100 or may measure the level of any pressure applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, in response to the mobile terminal 100 being placed in a call mode, the display module 151 may display a user interface (UI) or a graphic user interface (GUI) for making or receiving a call. In response to the mobile terminal 100 being placed in a video call mode or an image capturing mode, the display module 151 may display a UI or a GUI for capturing or receiving images.

In a case in which the display module 151 and the user input unit 130 form a layer structure together and are thus implemented as a touch screen, the display module 151 may be used as both an output device and an input device. In a case in which the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. In a case in which the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

In a case in which the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior structure of the mobile terminal 100 will hereinafter be described in detail with reference to FIGS. 2 and 3. The present invention can be applied to nearly all types of mobile terminals such as a folder-type, a bar-type, a swing-type and a slider-type mobile terminal However, for convenience, it is assumed that the mobile terminal 100 is a bar-type mobile terminal equipped with a full touch screen.

Figure 2:
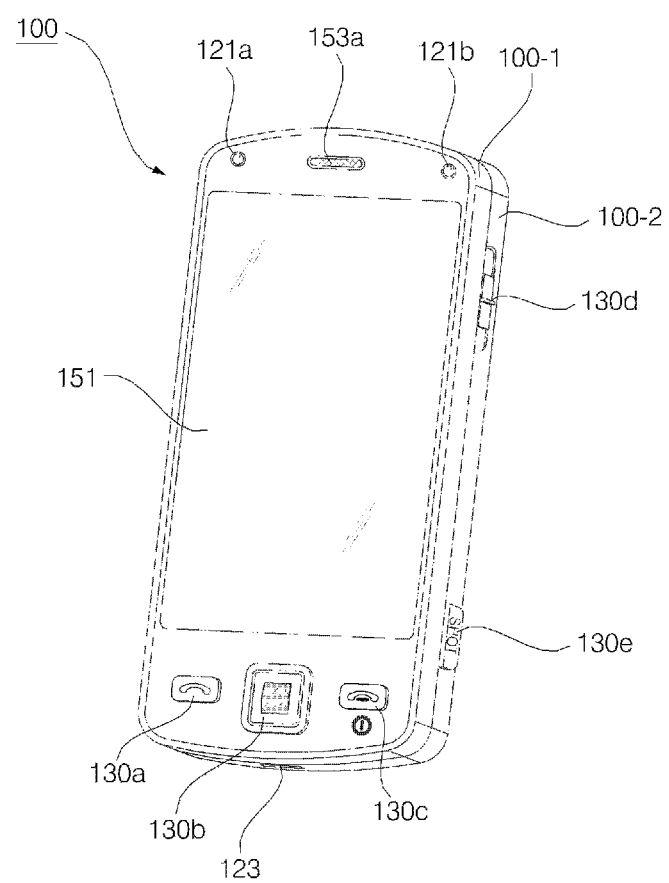
FIG. 2 is a front perspective view of the mobile terminal shown in FIG. 1.
Figure 3:
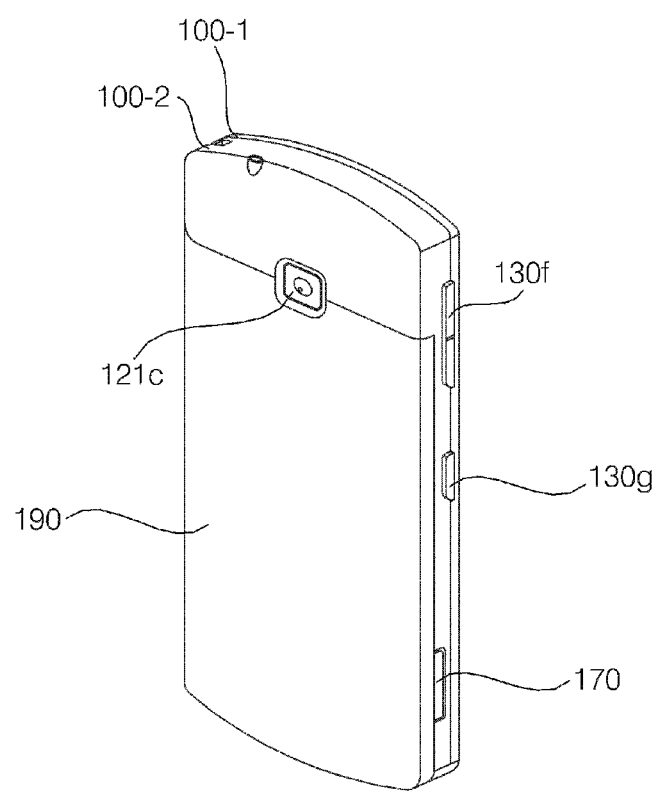
FIG. 3 is a rear perspective view of the mobile terminal shown in FIG. 2.

FIG. 2 illustrates a front perspective view of the mobile terminal 100, and FIG. 3 illustrates a rear perspective view of the mobile terminal 100. Referring to FIG. 2, the exterior of the mobile terminal 100 may be formed by a front case 100-1 and a rear case 100-2. Various electronic devices may be installed in the space formed by the front case 100-1 and the rear case 100-2. The front case 100-1 and the rear case 100-2 may be formed of a synthetic resin through injection molding. Alternatively, the front case 100-1 and the rear case 100-2 may be formed of a metal such as stainless steel (STS) or titanium (Ti).

The display module 151, a first audio output module 153a, first and second cameras 121a and 121b, and first, second, and third user input modules 130a, 130b, and 130c may be disposed in the main body of the mobile terminal 100, and particularly, on the front case 100-1. Fourth and fifth user input modules 130d and 130e and the microphone 123 may be disposed on one side of the rear case 100-2.

In a case in which a touch pad is configured to overlap the display module 151 and thus to form a mutual layer structure, the display module 151 may serve as a touch screen. Thus, the user can enter various information to the mobile terminal 100 simply by touching the display module 151.

The first audio output module 153a may be implemented as a receiver or a speaker. The first and second cameras 121a and 121b may be configured to be suitable for capturing a still or moving image of the user. The first and second cameras 121a and 121b may be used to control a 3D pointer during a stereoscopic 3D mode.

The microphone 123 may be configured to properly receive the user's voice or other sounds.

The first, second, third, fourth, and fifth user input modules 130a, 130b, 130c, 130d, and 130e and sixth and seventh user input modules 130f and 130g may be collectively referred to as the user input unit 130, and any means can be employed as the first, second, third, fourth, fifth, sixth, and seventh user input modules 130a, 130b, 130c, 130d, 130e, 130f, and 130g so long as it can operate in a tactile manner. For example, the user input unit 130 may be implemented as a dome switch or a touch pad that can receive a command or information according to a pressing or a touch operation by the user, or may be implemented as a wheel or jog type for rotating a key or as a joystick. In terms of function, the first, second, and third user input modules 130a, 130b, and 130c may operate as function keys for entering a command such as start, end, or scroll, the fourth user input module 130d may operate as a function key for selecting an operating mode for the mobile terminal 100, and the fifth user input module 130e may operate as a hot key for activating a special function within the mobile terminal 100.

Referring to FIG. 3, a third camera 121c may be additionally provided at the rear of the rear case 100-2, and the sixth and seventh user input modules 130f and 130g and the interface unit 170 may be disposed on one side of the rear case 100-2.

The third camera 121c may have an image capture direction which is substantially the opposite to that of the first and second cameras 121a and 121b, and may have a different resolution from that of the first camera 121a.

A flash and a mirror may be disposed near the third camera 121c. Another camera may be additionally provided near the third camera 121c and may thus be used to capture a stereoscopic 3D image.

When the third camera 121c captures an image of a subject, the flash may illuminate the subject. The mirror may allow the user to see him- or herself for capturing his or her own image with the third camera 121c.

Another audio output module (not shown) may be additionally provided on the rear case 100-2. The audio output module on the rear case 100-2 may realize a stereo function along with the audio output module 153 on the front case 100-1. The audio output module on the rear case 100-2 may also be used in a speaker-phone mode.

The interface unit 170 may used as a passage allowing the mobile terminal 100 to exchange data with an external device either through a fixed line or wirelessly.

A broadcast signal reception antenna may be disposed at one side of the front or rear case 100-1 or 100-2, in addition to an antenna used for call communication. The broadcast signal reception antenna may be installed such that it can be extended from the front or rear case 100-1 or 100-2.

The power supply unit 190 may be mounted on the rear case 100-2 and may supply power to the mobile terminal 100. The power supply unit 190 may be, for example, a chargeable battery which can be detachably combined to the rear case 100-2 for being charged.

The third camera 121c and other elements that have been described above as being disposed in the rear case 100-2 may be disposed elsewhere in the mobile terminal 100. The third camera 121c may be optional in a case in which the first or second camera 121a or 121b is configured to be rotatable and thus to cover the image capture direction of the third camera 121c.

Figure 4:
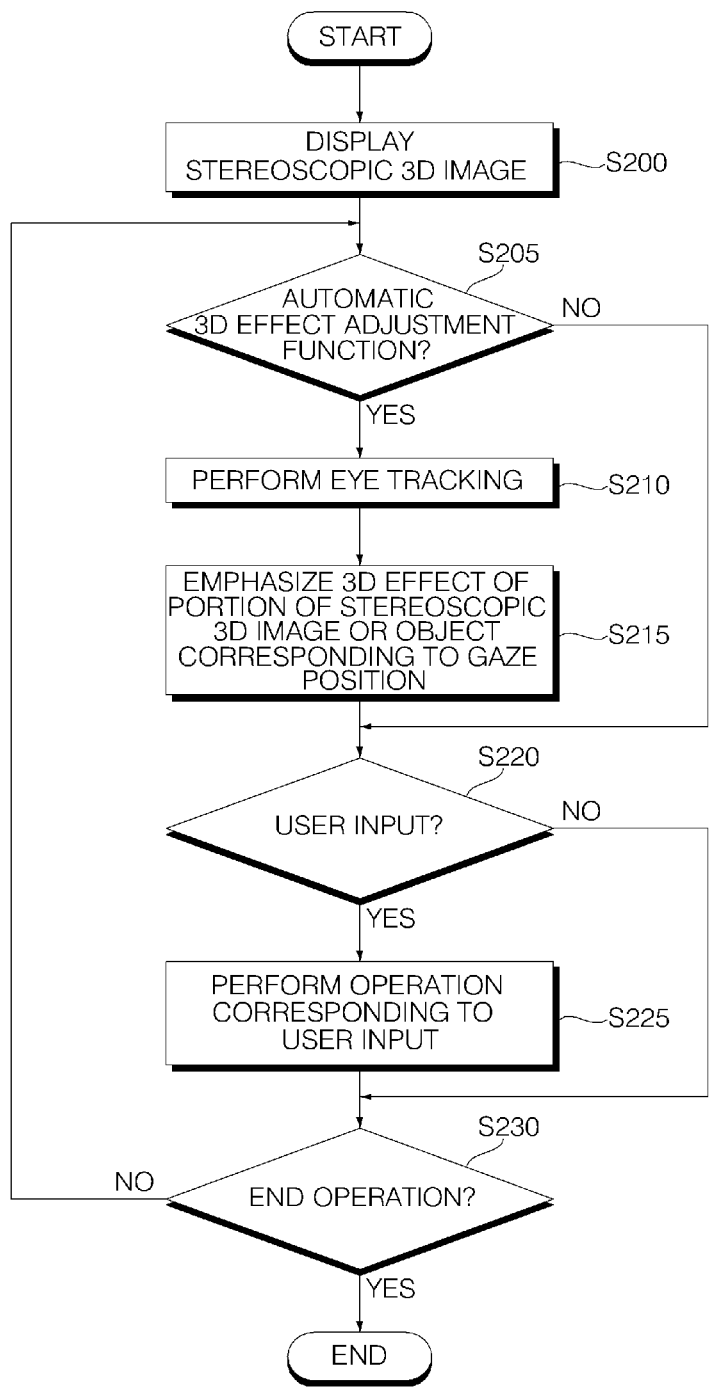
FIG. 4 is a flowchart illustrating an operation control method of a mobile terminal, according to a first exemplary embodiment of the present invention.

FIG. 4 illustrates an operation control method of a mobile terminal, according to a first exemplary embodiment of the present invention, and more particularly, how to automatically adjust a 3D effect using eye tracking.

Eye tracking is a technique of keeping track of a user's gaze by analyzing images of the user captured by a camera. By using eye tracking, the position of the user's gaze can be detected in real time. The use of eye tracking can be equally applied not only to the first exemplary embodiment but also to other exemplary embodiments of the present invention.

Referring to FIG. 4, the controller 180 displays a stereoscopic 3D image, which is created based on the disparity between left- and right-eye images, on the display module 151 in response to, for example, a user command (S200).

Stereoscopic 3D images are images that can create the illusion of depth in an image and can thus provide viewers with a vivid sense of reality. The two eyes are about 65 mm apart from each other. Thus, when each of the two eyes is presented with different 2D images of the world, the 2D images are projected first onto the retinas of the two eyes, and the brain extracts depth from the 2D retinal images using binocular disparity, which results from the horizontal separation of the two eyes and is one of the most important factors that should be considered when designing a 3D display device.

There are various methods of displaying a 3D image such as a stereoscopic display method, which is a method of displaying a 3D image with the use of glasses, an auto-stereoscopic display method, which is a method of displaying a 3D image without the use of glasses and is also called glasses-free 3D, and a projection method, which uses holography. The stereoscopic display method is generally used in home TV sets, and the auto-stereoscopic display method is generally used in mobile terminals.

Examples of the auto-stereoscopic display method include, but are not limited to a lenticular display method, a parallax barrier method and a parallax illumination method. The lenticular display method involves using a sheet of hemispherical lenticular lenses to the front of a device that displays left- and right-eye images. The parallax barrier display method involves projecting left- and right-eye images through a parallax barrier. The parallax illumination method involves placing an illumination plate behind an LCD so as to make alternate columns of pixels visible to the left and right eyes. Research is being conducted on various stereoscopic 3D imaging technique, other than those set forth herein, using several factors that can create the sense of three-dimensionality.

In a case in which an automatic 3D effect adjustment function is set (S205), the controller 180 performs eye tracking using an image of a user captured by the camera 121 (S210). The controller 180 detects the position of the user's gaze on the stereoscopic 3D image based on the results of the eye tracking process performed in S210, and highlights a portion of the stereoscopic 3D image or an object in the stereoscopic 3D image corresponding to the detected gaze position (S215).

For example, the controller 180 may highlight the stereoscopic 3D image portion or the object corresponding to the detected gaze position such that the stereoscopic 3D image portion or the object corresponding to the detected gaze position can appear to protrude further than the rest of the stereoscopic 3D image. It may be determined whether to highlight a part of the stereoscopic 3D image or an object in the stereoscopic 3D image according to a setting in the mobile terminal 100.

In a case in which a user input such as a touch input or a key input is received (S220), the controller 180 controls an operation corresponding to the received user input to be performed (S225). In a case in which a communication event such as an incoming call or message occurs, the controller 180 may control an operation corresponding to the occurred communication event.

Operations S205 through S225 are repeatedly performed until the user chooses to stop displaying the stereoscopic 3D image (S230).

According to the first exemplary embodiment, it is possible to highlight a 3D effect for a part of a stereoscopic 3D image or an object in the stereoscopic 3D image by keeping track of a user's gaze.

Figure 5:
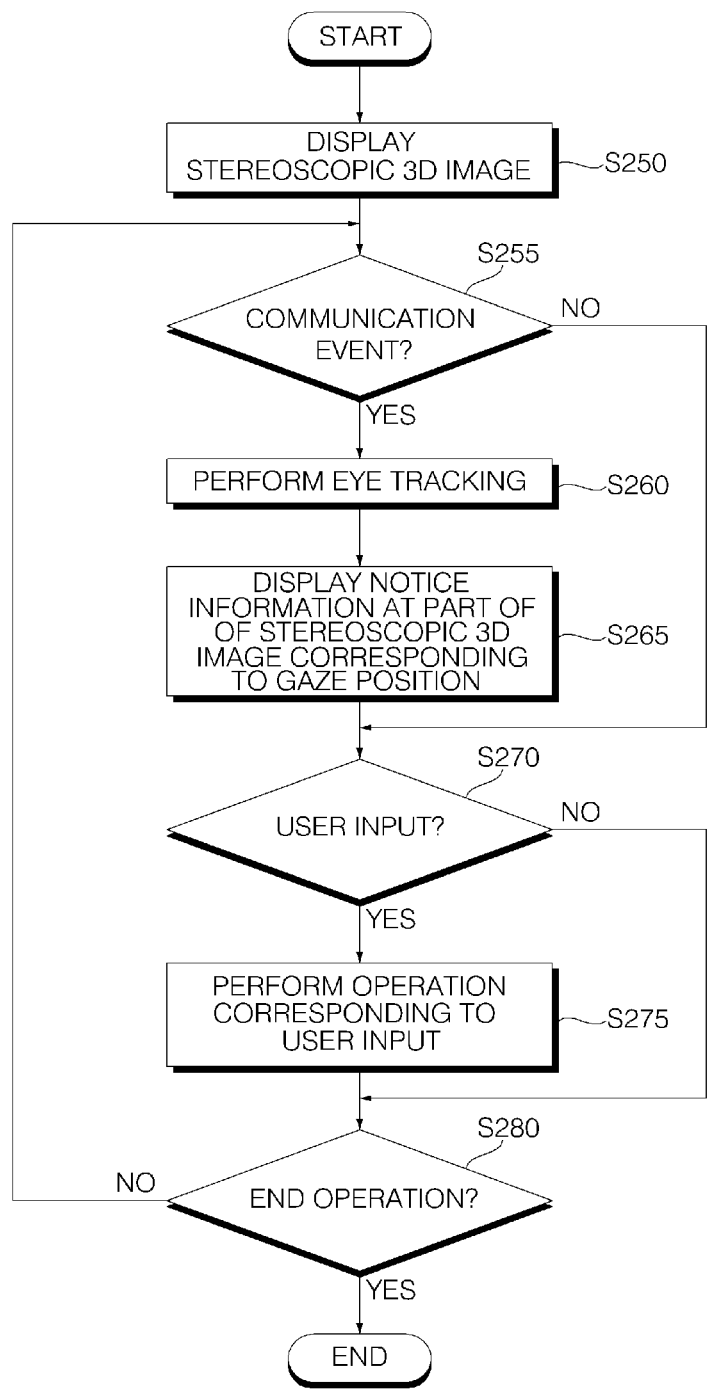
FIG. 5 is a flowchart illustrating an operation control method of a mobile terminal, according to a second exemplary embodiment of the present invention.

FIG. 5 illustrates an operation control method of a mobile terminal, according to a second exemplary embodiment of the present invention, and more particularly, how to display notification information using eye tracking in response to a communication event occurring.

Referring to FIG. 5, the controller 180 displays a stereoscopic 3D image, which is created based on the disparity between left- and right-eye images, on the display module 151 in response to, for example, a user command (S250).

In a case in which a communication event such as an incoming call, message or email occurs when the stereoscopic 3D image is displayed on the display module 151 (S255), the controller 180 detects the position of a user's gaze on the stereoscopic 3D image by performing eye tracking using an image of a user captured by the camera 121 (S260).

The controller 180 displays notification information indicating the occurrence of the communication event at a position on the stereoscopic 3D image corresponding to the detected gaze position (S265).

The notification information may be displayed as a two-dimensional (2D) object or as a stereoscopic 3D object whose 3D effect is highlighted as compared to other objects.

In a case in which a user input is received (S270), the controller 180 controls an operation corresponding to the received user input to be performed (S275).

Operations S266 through S275 are repeatedly performed until the user chooses to stop displaying the stereoscopic 3D image (S280).

According to the second exemplary embodiment, in response to a communication event occurring, it is possible to detect the position of a user's gaze on a stereoscopic 3D image through eye tracking and display notification information at a position on the stereoscopic 3D image corresponding to the detected gaze position.

Figure 6:
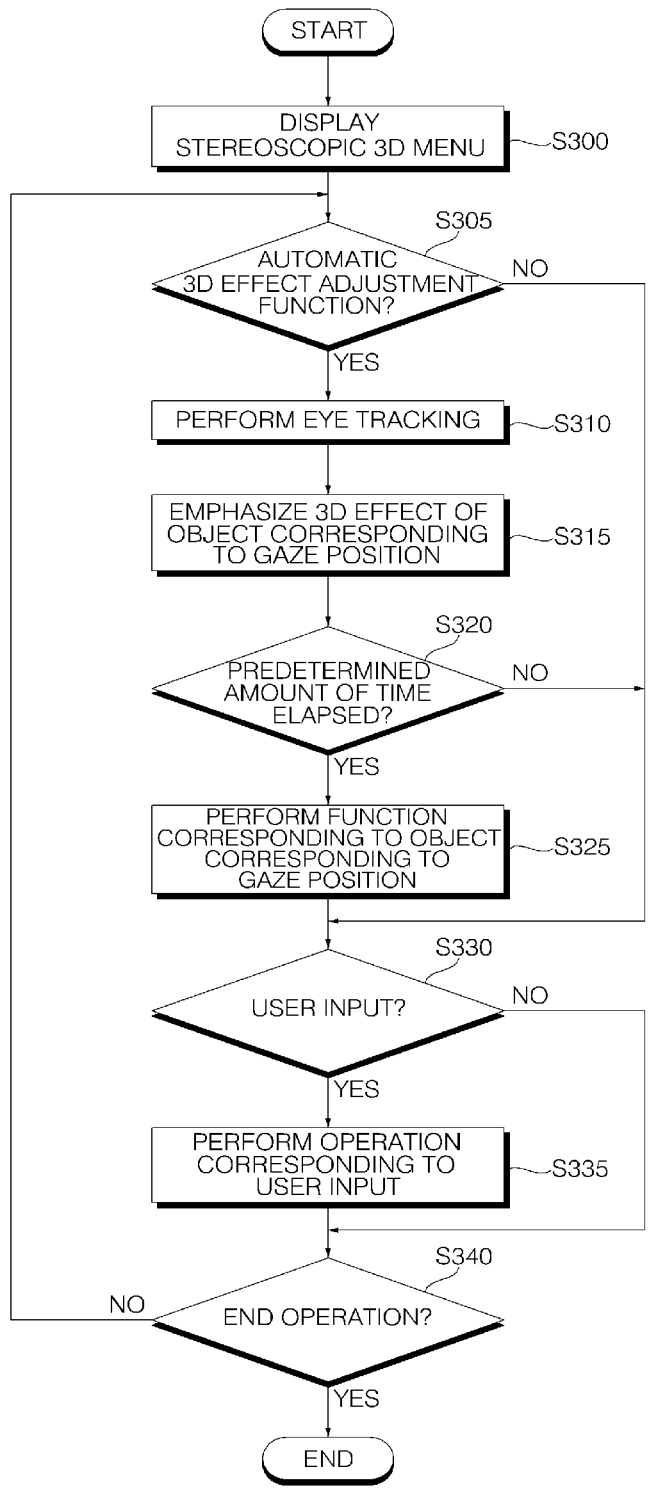
FIG. 6 is a flowchart illustrating an operation control method of a mobile terminal, according to a third exemplary embodiment of the present invention.

FIG. 6 illustrates an operation control method of a mobile terminal, according to a third exemplary embodiment of the present invention, and more particularly, how to perform a predetermined function using eye tracking.

Referring to FIG. 6, the controller 180 displays a stereoscopic 3D menu including a plurality of menu items on the display module 151 in response to, for example, a user command (S300).

In a case in which an automatic menu execution function is set (S305), the controller 180 performs eye tracking using an image of a user captured by the camera 121 (S310).

The controller 180 detects the position of the user's gaze on the stereoscopic 3D menu based on the results of the eye tracking process performed in S310, and increases the 3D effect of an object in the stereoscopic 3D image corresponding to the detected gaze position (S315).

In response to a predetermined amount of time elapsing with the user's gaze fixed at the detected gaze position, the controller 180 controls a function corresponding to the object corresponding to the detected gaze position to be performed (S325). For example, in a case in which the object corresponding to the detected gaze position is a menu icon, the controller 180 may adjust the depth of the menu icon such that the menu icon can appear to protrude further than other menu icons. Then, in response to the depth of the menu icon being adjusted below a reference level, the controller 180 may control a function corresponding to the menu icon to be performed.

In a case in which a user input is received (S330), the controller 180 controls an operation corresponding to the received user input to be performed (S335).

Operations S305 through S335 are repeatedly performed until the user chooses to stop displaying the stereoscopic 3D menu (S340).

According to the third exemplary embodiment, it is possible to automatically perform an operation corresponding to an object in a stereoscopic 3D image being gazed upon by a user by keeping track of the user's gaze on the stereoscopic 3D image.

Figure 7:
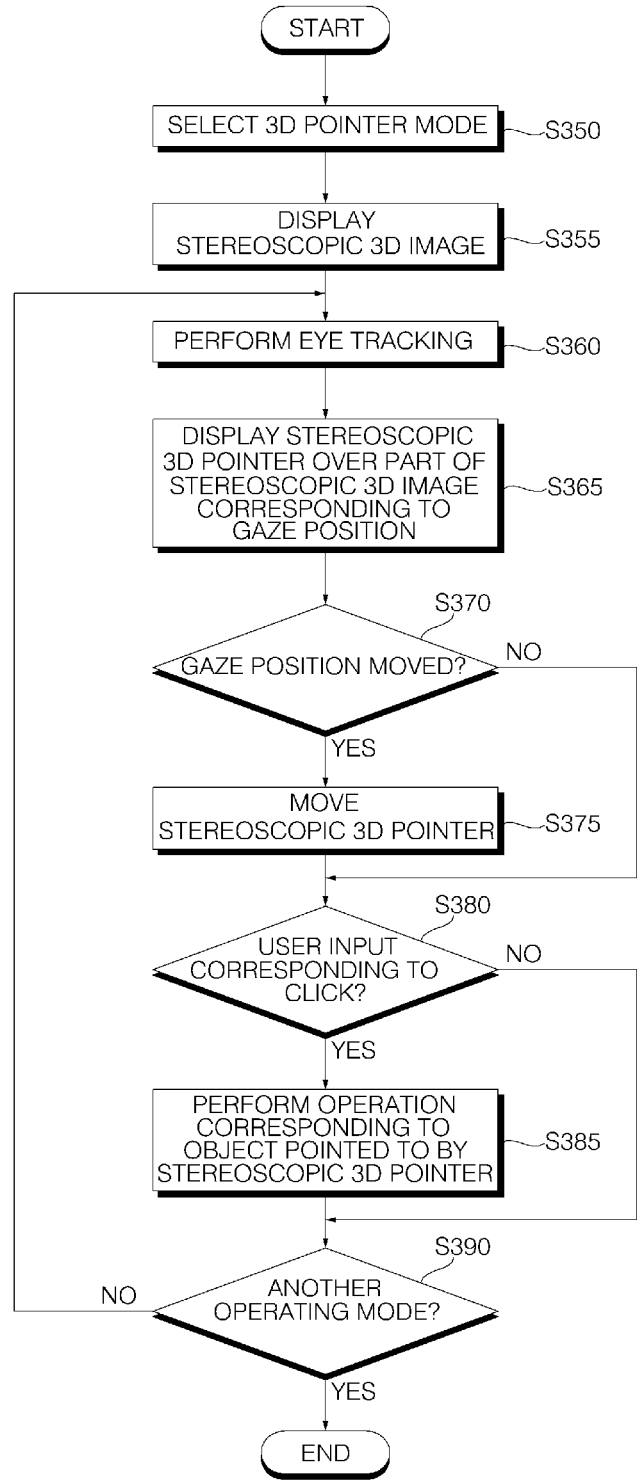
FIG. 7 is a flowchart illustrating an operation control method of a mobile terminal, according to a fourth exemplary embodiment of the present invention.

FIG. 7 illustrates an operation control method of a mobile terminal, according to a fourth exemplary embodiment of the present invention, and more particularly, how to display and use a 3D pointer using eye tracking.

Referring to FIG. 7, a 3D pointer mode is set in response to, for example, a user command (S350). In response to the 3D pointer mode being set, the controller 180 displays a stereoscopic 3D image, which is created based on the disparity between left- and right-eye images, on the display module 151 (S355).

The controller 180 performs eye tracking using an image of a user captured by the camera 121 (S360). The controller 180 detects the position of the user's gaze on the stereoscopic 3D image based on the results of the eye tracking process performed in S360, and displays a 3D pointer at a position on the stereoscopic 3D image corresponding to the detected gaze position (S365).

The 3D pointer may be displayed in various shapes, such as a circular shape, an arrow shape, or any other shape set by the user. The color or transparency of the 3D pointer may be configured to be set by the user.

In a case in which a change in the position of the user's gaze on the stereoscopic 3D image is detected through the analysis of an image of the user captured by the camera 121 (S370), the controller 180 controls the 3D pointer to be moved to a position on the stereoscopic 3D image corresponding to the changed gaze position (S375).

For example, the 3D pointer may be moved vertically or horizontally over the stereoscopic 3D image according to a variation in the position of the user's gaze on the stereoscopic 3D image. In response to the 3D pointer being moved, an indicator of a current spatial position of the 3D pointer may be displayed over the stereoscopic 3D image.

In a case in which a predetermined user input corresponding to a mouse click is received (S380), the controller 180 controls a function corresponding to an object currently being pointed to by the 3D pointer to be performed (S385). Examples of the object currently being pointed to by the 3D pointer include a hyperlink object, a soft key, a menu icon, and the like. The object currently being pointed to by the 3D pointer may be displayed differently in color or shape from other objects in the stereoscopic 3D image.

As an example, in a case in which the user's gaze is fixed on one point on the stereoscopic 3D image and thus the 3D pointer is not moved for more than a predetermined amount of time, it may be determined that the user input corresponding to a mouse click has been received. In this case, an operation corresponding to a mouse click may be performed, and thus, the function corresponding to the object currently being pointed to by the 3D pointer, may be executed. The user may determine when to perform the operation corresponding to a mouse click in response to the predetermined user input corresponding to a mouse click.

As another example, the operation corresponding to a mouse click may be configured to be performed in response to the user blinking his or her eyes. In a case in which the user blinks his or her eyes twice and moves his or her gaze, an operation corresponding to a drag input may be configured to be performed.

Operations S360 through S385 are repeatedly performed until the user chooses another operating mode (S390).

According to the fourth exemplary embodiment, it is possible to intuitively perform a control operation desired by a user according to the position of the user's gaze on a stereoscopic 3D image.

Eye tracking involves using a camera that recognizes an image, instead of using a typical sensor, and consumes a relatively large amount of power. As one example, an image may be captured by driving a camera at regular intervals of time. In a case in which the captured image does not include any human face, the camera may be stopped from operating, and may be resumed a predetermined amount of time later, thereby reducing power consumption.

As another example, a camera may be driven only in response to an object being detected within a close vicinity of the camera by a proximity sensor or in response to a predetermined illumination level or higher being detected by an illumination sensor.

External keys may be configured to be activated by eye tracking. For example, a camera function may be performed in response to an external camera key of a mobile terminal being gazed upon, or a call-related function may be performed in response to an external 'call' key of the mobile terminal being gazed upon. By activating external keys of a mobile terminal through eye tracking, it is possible to improve the convenience of the manipulation of the mobile terminal.

The exemplary embodiments of FIGS. 4 through 7 will hereinafter be described in further detail with reference to FIGS. 8 through 13.

Figure 9:
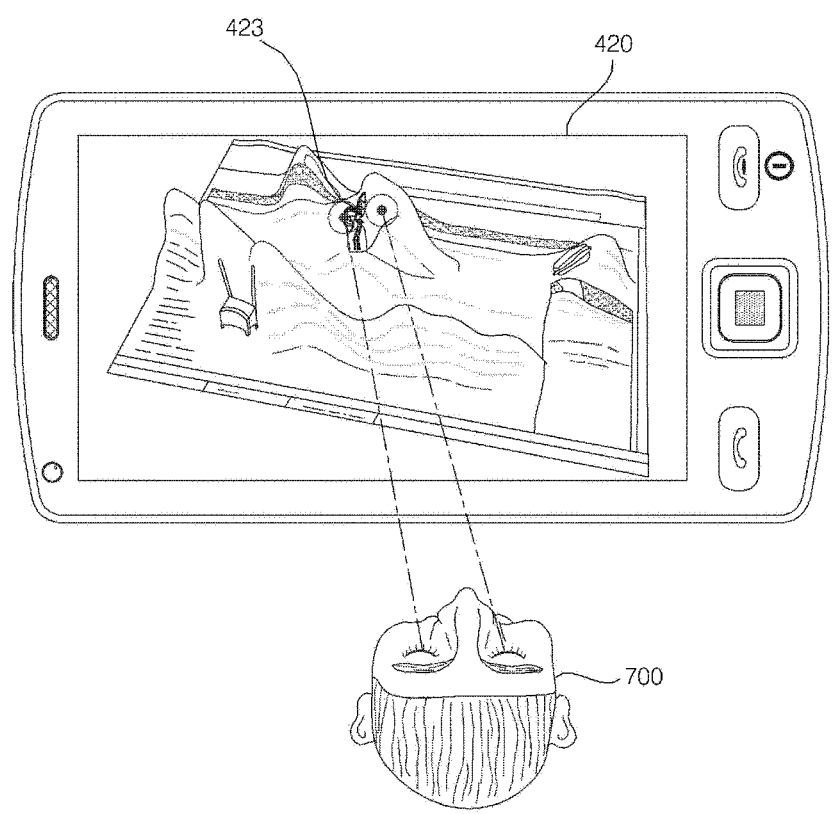

FIGS. 8 and 9 illustrate an example of how to perform an automatic 3D effect adjustment function when a stereoscopic 3D image is displayed. Referring to FIGS. 8(a) and 8(b), in a case in which the automatic 3D effect adjustment function is set when a stereoscopic 3D image 400 is displayed, the 3D effect of a portion 410 of the stereoscopic 3D image 400 determined through eye tracking as currently being gazed upon by a user 700 may be emphasized, compared to the rest of the stereoscopic 3D image 400.

For example, in response to a left portion of the stereoscopic 3D image 400 being gazed upon by the user 700, a maximum 3D effect may be applied to the left portion of the stereoscopic 3D image 400, and the 3D effect of the rest of the stereoscopic 3D image 400 may become less, closer to the right side of the stereoscopic 3D image 400. In response to the gaze position of the user 700 moving, the stereoscopic 3D image portion 410 may return to its original 3D effect.

Referring to FIG. 9, the 3D effect of an object 423 in a stereoscopic 3D image 420 may be selectively emphasized in response to the object 423 being gazed upon by the user 700. That is, the 3D effect of an object having a predetermined depth level or higher may be emphasized in response to the object being gazed upon by the user 700. In a case in which a moving object is being gazed upon by the user 700, the 3D effect of the moving object may be selectively emphasized.

Figure 10:
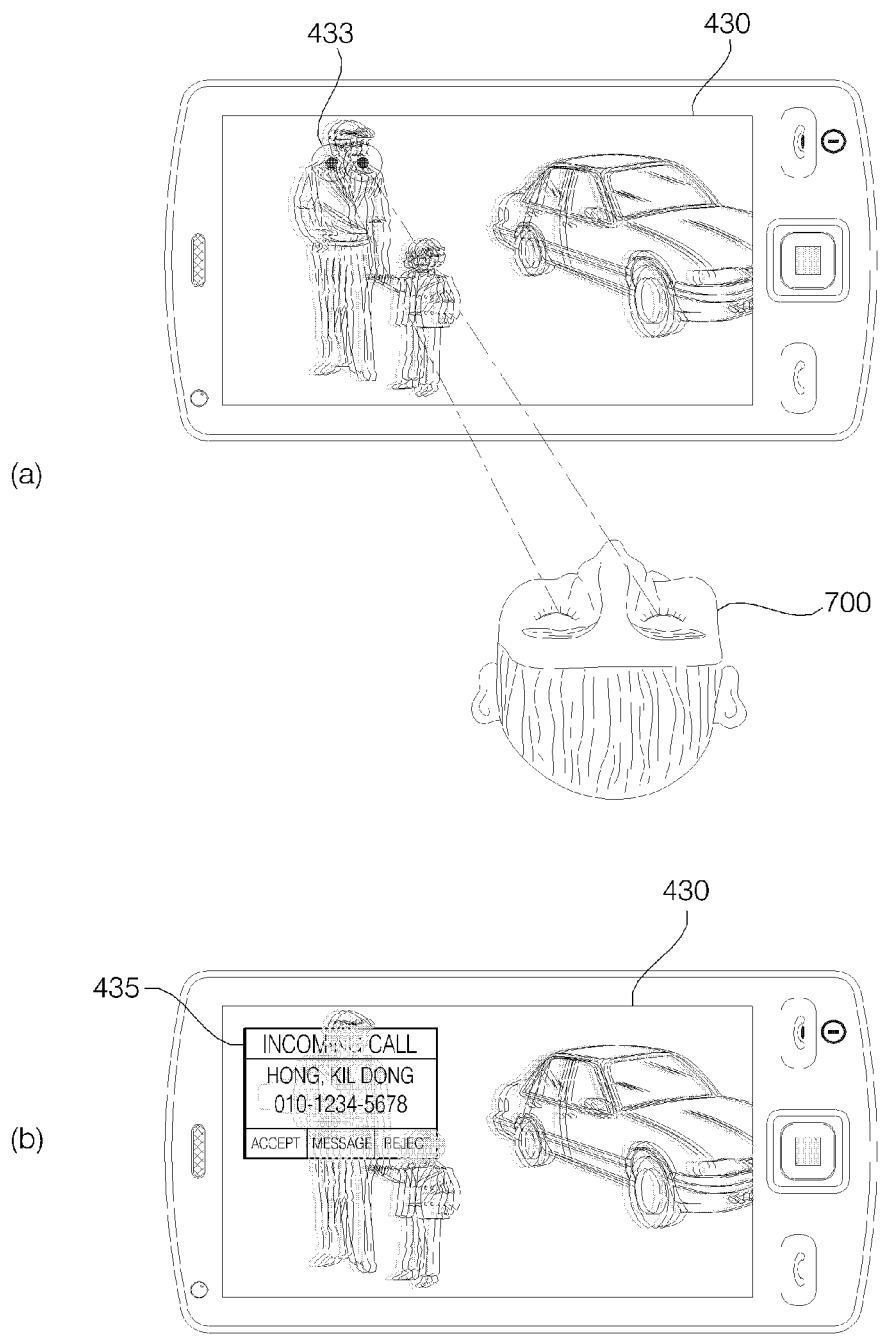

FIG. 10 illustrates the occurrence of a communication event when a stereoscopic 3D image is displayed. Referring to FIG. 10(a), in response to a communication event occurring when a stereoscopic 3D image 430 is displayed, a current gaze position 433 of the user 700 may be determined.

Referring to FIG. 10(b), notice information 435 indicating the occurrence of the communication event may be displayed at the current gaze position 433 of the user 700. The notice information 435 may be displayed two-dimensionally or may be displayed three-dimensionally so as to appear to protrude further than other objects.

Figure 11:
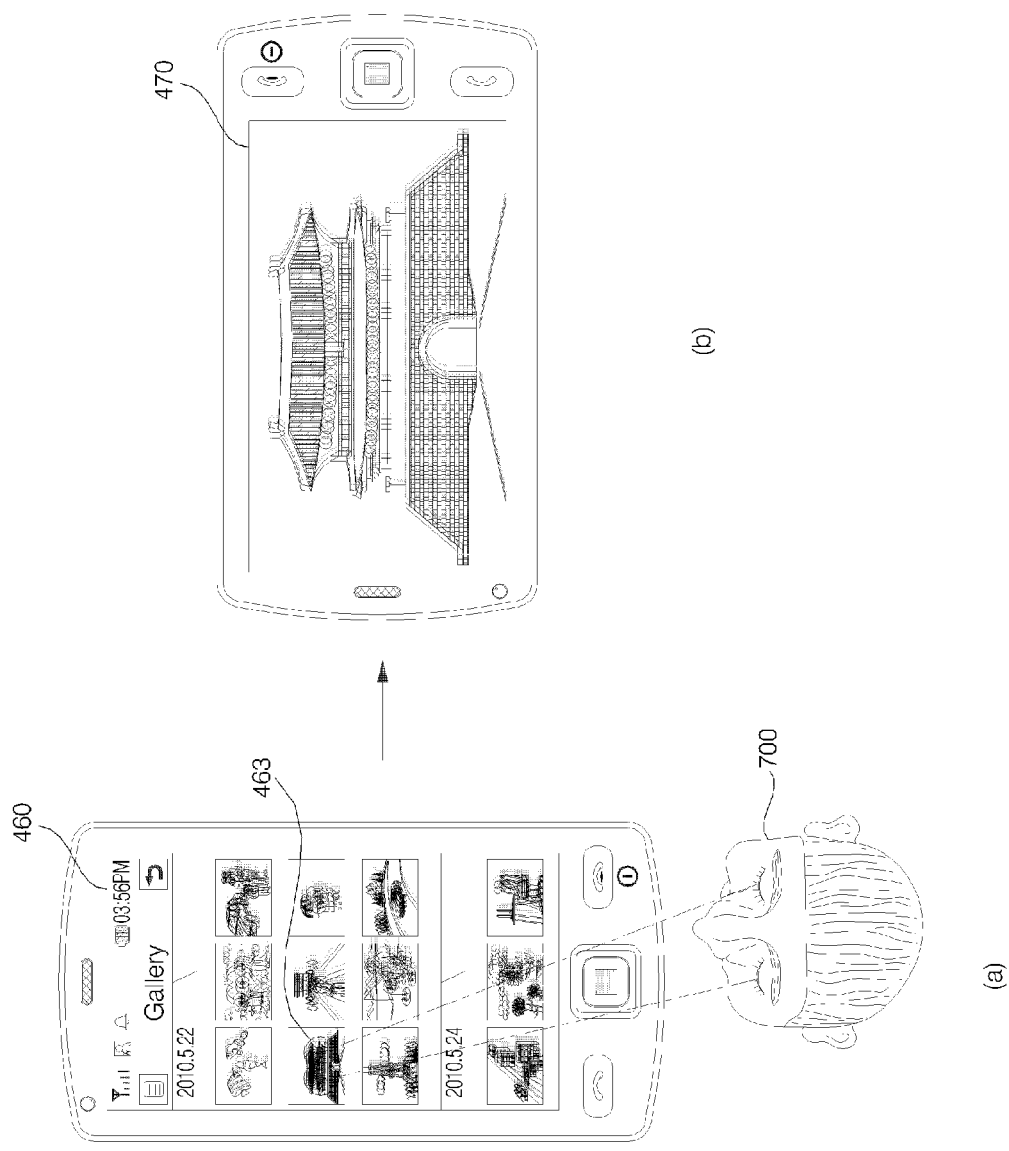

FIG. 11 illustrates how to perform a predetermined function according to the gaze position of a user when a stereoscopic 3D menu is displayed. Referring to FIG. 11(a), a plurality of 3D thumbnail images are displayed on a display screen 460. In response to one of the 3D thumbnail images, i.e., a 3D thumbnail image 463, being gazed upon by the user 700, the 3D effect of the 3D thumbnail image 463 may be emphasized. Referring to FIG. 11(b), a stereoscopic 3D image 470 corresponding to the 3D thumbnail image 463 may be displayed a predetermined amount of time after the emphasizing of the 3D effect of the 3D thumbnail image 463.

In short, referring to FIGS. 11(a) and 11(b), it is possible to perform a predetermined function using eye tracking when a stereoscopic 3D menu is displayed.

Figure 12:
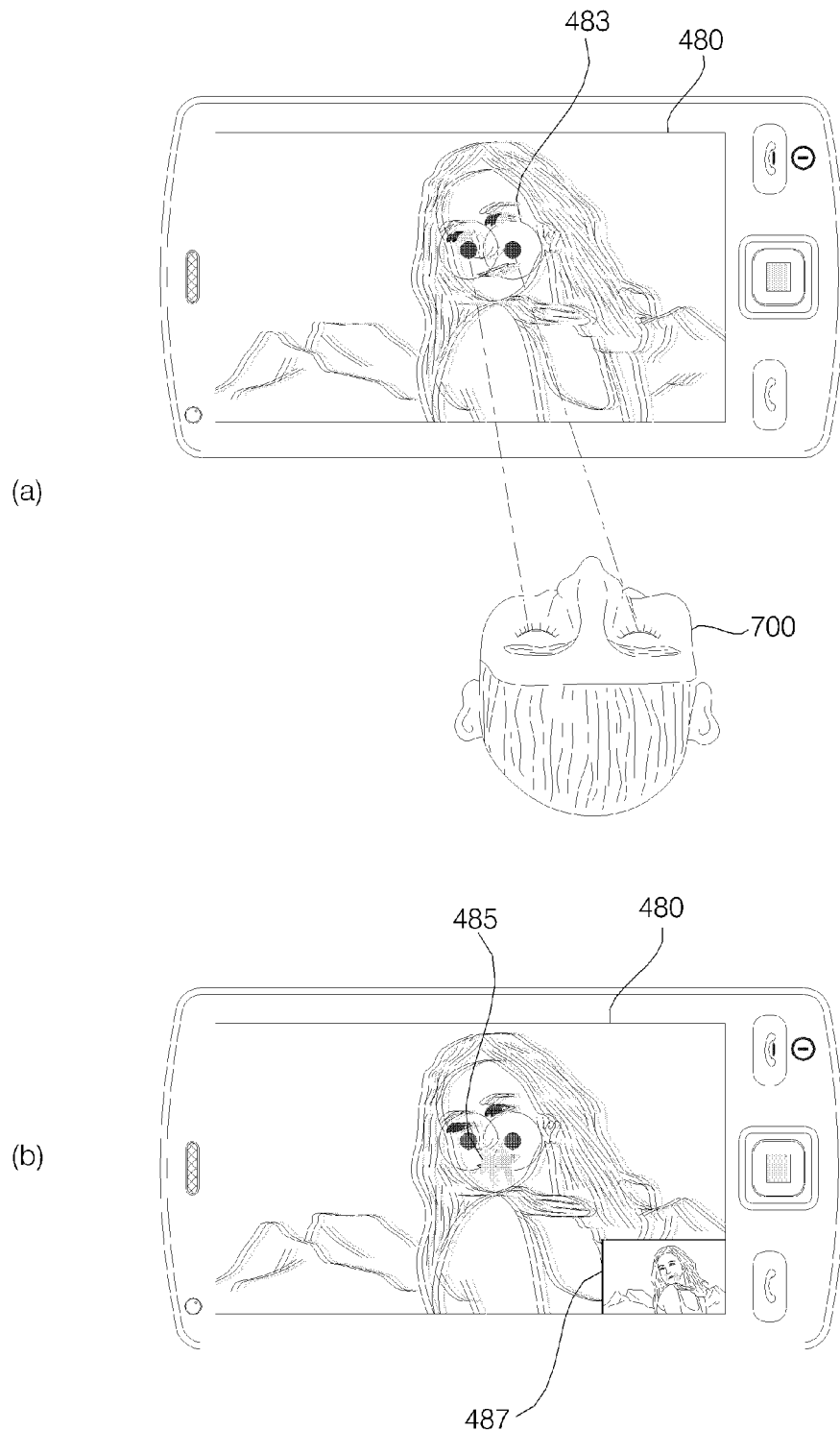

FIG. 12 illustrates the use of a stereoscopic 3D pointer through eye tracking when a stereoscopic 3D image is displayed. Referring to FIGS. 12(a) and 12(b), in a case in which a stereoscopic 3D pointer mode is set when a stereoscopic 3D image 480 is displayed, a gaze position 480 of the user 700 may be determined, and a stereoscopic 3D pointer 485 may be displayed over the stereoscopic 3D image 480. The stereoscopic 3D pointer 485 may move along with the gaze position 480 of the user 700. In response to the stereoscopic 3D pointer 485 being displayed, a 3D mini-map 487 may be displayed over one part of the stereoscopic 3D image 480, and may indicate a current location and depth of the stereoscopic 3D pointer 485.

A menu for adjusting the transparency or shape of the stereoscopic 3D pointer 485 may be additionally provided so that the user can set the transparency or shape of the stereoscopic 3D pointer 485.

Objects belonging to the same depth layer as the stereoscopic 3D pointer 485 may be displayed in a different color or with a different background color from objects belonging to a different depth layer from the stereoscopic 3D pointer 485 or a screen effect such as a shadow effect may be applied to the objects belonging to the same depth layer as the stereoscopic 3D image 480 so that the objects belonging to the same depth layer as the stereoscopic 3D image 480 can be easily distinguished from the objects belonging to a different depth layer from the stereoscopic 3D pointer 485. An object approached or pointed to by the stereoscopic 3D pointer 485 may be displayed distinguishably from other objects.

Figure 13:
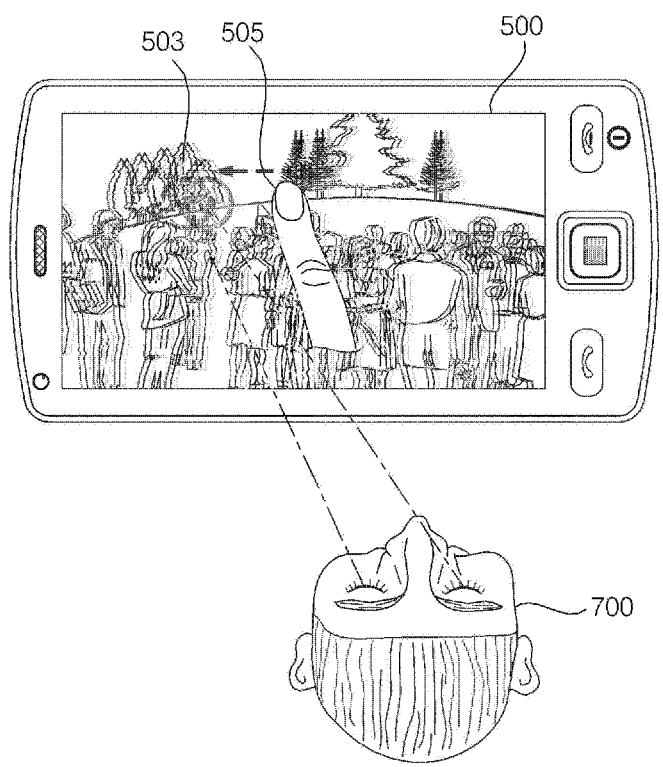

Referring to FIG. 13, in response to a touch input 505 being received from the user 700 in an effort to select a gaze position 503 of the user 700 from a stereoscopic 3D image 500, the gaze position 503 may be corrected for any difference from a touch point corresponding to the touch input 505.

By correcting the gaze position 503, it is possible to correct an eye tracking error. Once the correction of the gaze position 503 is complete, a stereoscopic 3D pointer may be displayed at the corrected gaze position, an object corresponding to the corrected gaze position may be emphasized, or a function corresponding to the object corresponding to the corrected gaze position may be performed.

The mobile terminal according to the present invention and the operation control method thereof, according to the present invention are not restricted to the exemplary embodiments set forth herein. Therefore, variations and combinations of the exemplary embodiments set forth herein may fall within the scope of the present invention.

The present invention can be realized as code that can be read by a processor included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to adjust the 3D effect of a stereoscopic 3D image, perform certain functions, and perform a precise control of a stereoscopic 3D pointer using eye tracking. Therefore, it is possible to enable an intuitive manipulation of a stereoscopic 3D image through eye tracking and thus to effectively control various operations performed by a mobile terminal in connection with a stereoscopic 3D image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An operation control method of a mobile terminal, the operation control method comprising:
   displaying a stereoscopic three-dimensional (3D) image, the stereoscopic 3D image being created by disparity between left- and right-eye images, on a display module;
   driving a camera in response to an object being detected within a close vicinity of the camera by a proximity sensor;
   determining a position of a user's gaze on the stereoscopic 3D image by performing eye tracking based on an image of the user captured by the camera; and
   varying a 3D effect of a portion of the stereoscopic 3D image corresponding to the determined gaze position,
   wherein varying the 3D effect comprises highlighting the portion of the stereoscopic 3D image corresponding to the detected gaze position such that the portion of the stereoscopic 3D image appears to protrude further than the rest of the stereoscopic 3D image.

2. The operation control method of claim 1, further comprising, in response to the position of the user's gaze on the stereoscopic 3D image moving, displaying the stereoscopic 3D image portion corresponding to the determined gaze position with an original 3D effect.

3. The operation control method of claim 1, further varying a 3D effect of an object corresponding to the determined gaze position.

4. The operation control method of claim 1, further comprising highlighting a part of the stereoscopic 3D image according to a setting in the mobile terminal.

5. The operation control method of claim 1, further comprising:
   receiving an input from the user and controlling an operation corresponding to the input.

6. The operation control method of claim 1, further comprising:
   receiving an incoming communication event and controlling an operation corresponding to the incoming communication event.

7. The operation control method of claim 1, further comprising:
   repeating the steps of displaying a stereoscopic three-dimensional (3D) image, determining a position of a user's gaze on the stereoscopic 3D image by performing eye tracking, and varying a 3D effect of a portion of the stereoscopic 3D image corresponding to the determined gaze position until the user chooses to stop displaying the stereoscopic 3D image.

8. The operation control method of claim 1, further comprising:
   emphasizing the 3D effect on the portion gazed upon by the user.

9. The operation control method of claim 1, further comprising:
   receiving a touch input to select a gaze position; and
   moving the determined position of a user's gaze to a position of the touch input.

10. A mobile terminal, comprising:
    a camera;
    a display configured to display a stereoscopic 3D image, the stereoscopic 3D image being created by disparity between left- and right-eye images; and
    a proximity sensor configured to detect an object within a close vicinity of the camera; and
    a controller configured to:
      drive the camera in response to detection of the object;
      determine a position of a user's gaze on the stereoscopic 3D image by performing eye tracking based on an image of the user captured by the camera;
      vary a 3D effect of a portion of the stereoscopic 3D image corresponding to the determined gaze position; and
      highlight the portion of the stereoscopic 3D image corresponding to the detected gaze position such that the portion of the stereoscopic 3D image appears to protrude further than the rest of the stereoscopic 3D image.

11. The mobile terminal of claim 10, wherein the controller is further configured to, in response to the position of the user's gaze on the stereoscopic 3D image moving, display the stereoscopic 3D image portion corresponding to the determined gaze position with an original 3D effect.

\* \* \* \* \*